United States Patent [19]

Deguchi et al.

[11] Patent Number: 5,248,720

[45] Date of Patent: Sep. 28, 1993

[54] PROCESS FOR PREPARING A POLYAMIDE COMPOSITE MATERIAL

[75] Inventors: Ryuichi Deguchi, Ube; Takeyoshi Nishio, Okazaki; Akane Okada, Nagoya, all of Japan

[73] Assignees: Ube Industries, Ltd., Ube; Toyota Jidosha Kabushiki Kaisha, Toyota; Kabushiki Kaisha Toyota Chuo Kenkyusho, Aichi, all of Japan

[21] Appl. No.: 831,005

[22] Filed: Feb. 6, 1992

Related U.S. Application Data

[62] Division of Ser. No. 400,986, Aug. 31, 1989, abandoned.

[30] Foreign Application Priority Data

| | | | |
|---|---|---|---|
| Sep. 6, 1988 | [JP] | Japan | 63-221387 |
| Oct. 7, 1988 | [JP] | Japan | 63-252088 |
| Oct. 14, 1988 | [JP] | Japan | 63-257306 |
| Dec. 27, 1988 | [JP] | Japan | 63-327790 |

[51] Int. Cl.$^5$ ............................................. C08K 3/34
[52] U.S. Cl. ............................ 524/444; 524/445; 524/447; 524/448; 524/449; 524/493; 524/459
[58] Field of Search ............... 524/493, 444, 445, 447, 524/448, 449, 459

[56] References Cited

U.S. PATENT DOCUMENTS

| | | | |
|---|---|---|---|
| 3,378,514 | 4/1968 | Norton | 260/37 |
| 3,901,769 | 8/1975 | Takatori et al. | 428/913 |
| 4,339,376 | 7/1982 | Kasahara et al. | 524/116 |
| 4,528,304 | 7/1985 | Yoshimura et al. | 524/599 |
| 4,659,760 | 4/1987 | van der Meer | 524/141 |
| 4,739,007 | 4/1987 | Okada et al. | 524/789 |
| 4,786,558 | 1/1987 | Sumiya et al. | 428/412 |
| 4,804,703 | 2/1989 | Subramanian | 524/445 |
| 4,810,734 | 3/1989 | Kawasumi et al. | 524/714 |
| 4,818,614 | 4/1989 | Fukui et al. | 428/403 |
| 4,822,837 | 4/1989 | van der Meer | 524/153 |
| 4,874,810 | 10/1989 | Lee, Jr. et al. | 524/505 |
| 4,889,885 | 12/1989 | Usuki et al. | 524/445 |
| 4,894,411 | 1/1990 | Okada et al. | 524/736 |
| 5,102,948 | 4/1992 | Deguchi et al. | 524/789 |
| 5,164,440 | 11/1992 | Deguchi et al. | 524/445 |

FOREIGN PATENT DOCUMENTS

| | | |
|---|---|---|
| 45-997 | 1/1970 | Japan . |
| 57-83551 | 5/1982 | Japan . |
| 63-10656 | 1/1983 | Japan . |
| 59-66452 | 4/1984 | Japan . |
| 59-41663 | 10/1984 | Japan . |
| 60-11966 | 3/1985 | Japan . |
| 62-74957 | 4/1987 | Japan . |
| 62-250050 | 10/1987 | Japan . |
| 1069656 | 5/1967 | United Kingdom . |

OTHER PUBLICATIONS

Derwent Abstract corresponding to JP 35211/83 (corresponding to JP Appln. No. 35890/75).

*Primary Examiner*—Melvin I. Marquis
*Attorney, Agent, or Firm*—Frishauf, Holtz, Goodman & Woodward

[57] ABSTRACT

A process for preparing a polyamide composite material comprising (1) contacting a layered silicate having a cation exchange capacity of 50 to 200 milliequivalents/100 g with an organic cation of a lactam which is a swelling agent in a dispersing medium, thereby obtaining a composite having the organic cation of the lactam adsorbed onto the layered silicate, and mixing the composite with a polyamide monomer; or (2) mixing a layered silicate having a cation exchange capacity of 50 to 200 milliequivalents/100 g with a compound which becomes a swelling agent through the action of an acid, a polyamide monomer and acid with pKa value of 0 to 3 in a dispersing medium. The mixture containing the polyamide monomer is polymerized to prepare the polyamide composite material.

21 Claims, No Drawings

PROCESS FOR PREPARING A POLYAMIDE COMPOSITE MATERIAL

This application is a division of application Ser. No. 07/400,986, filed Aug. 31, 1989, now abandoned.

BACKGROUND OF THE INVENTION

1. Field of the Invention

This invention relates to a material for a molded article and film having liquid or gas barrier property, more particularly to a material for a molded article having a liquid or gas barrier property to be used for fluid treatment such as delivery of fluid, storage or filtration of fluid, etc. such as a tube, tank, strainer, various covers, etc., and a material for a polyamide film having a excellent gas barrier property, transparency, slippage characteristic as well as the rigidity necessary for post-working such as lamination, printing, bag-making, etc., and methods for producing these materials.

2. Background Information

Polyamide resins have been widely utilized as injection and extruding molding materials for parts particularly of automobiles and electrical goods, because their molded articles have excellent mechanical properties.

However, polyamide resins have the property of permitting liquids or gases particularly such as water, alcohols, Freon gases, gasoline, etc. to permeate therethrough, posing various problems due to this property. For example, when a tube made of nylon is used as the Freon tube concerned with a freezing device, Freon is permeated therethrough, whereby there ensues the problem that the Freon within the device will be reduced; when a tank made of nylon is used as the brake tank in the field of automobiles, there is the problem that water will be incorporated into the brake fluid; and when a tank made of nylon is used as the gasoline tank, the problem occurs that water is incorporated into gasoline. Also, even when a gasoline tank consisting of two or more layers of polyethylene and nylon may be used, if the nylon layer is too thin, gasoline still permeates therethrough, whereby a problem may be caused which does not comply with environmental pollution regulations, etc.

For solving such problems, there have been made attempts to satisfy the standards by superposing a plurality of layers of resins with different barrier properties from each other. However, these also involve such a problem that the steps for producing molded articles are complicated, and also that still a fully satisfactory barrier property cannot be obtained.

The molded article of the polyamide resin of the prior art has various problems due to permeation of liquid or gas as described above.

While the molded articles of polyamide resins have been used as described above, polyamide films have been used mainly in the field of food packaging because of various excellent characteristics such as transparency, pinhole resistance, gas barrier property, heat resistance and oil resistance, etc.

Such polyamide films may be classified into unstretched films and stretched films. Polyamide films, which are inferior in water vapor barrier property and heat sealability, are frequently used as the film laminated with polyolefins by such means as co-extrusion or lamination.

In recent years, further improvement of gas barrier property has been demanded in food packaging, and the gas barrier property of polyamide films cannot be said to be sufficient depending on the use. Particularly, under highly humid conditions, the gas barrier property of polyamide films will be noticeably lowered. For this reason, there have been practiced co-extrusion molding of ethylene-vinyl alcohol copolymer (EVOH) excellent in gas barrier property with polyamide, or coating of polyvinylidene chloride (PVDC) with good gas barrier property on the surface of polyamide film. However, not only because such EVOH and PVDC are expensive, but also partly because of increased cost in the aspect of installations by increased layer constitutions of co-extruded films and provision of a coating line, etc., the demand cannot be satisfied also in the aspect of cost.

Further, in polyamide film, particularly nylon 6 film, the slippage characteristic and firmness (rigidity) will be lowered by moisture absorption under an environment of high humidity. Such lowering in rigidity may bring about troubles during post-working such as a lamination step, printing step, bag-making step, etc., and its improvement has been strongly demanded.

Of the above film characteristics, as the method for improving the slippage characteristic, there have been known the method to add metal soaps, bisamides, polyolefins, inorganic particles, etc., and among them addition of inert inorganic particles such as silicon dioxide, talc, kaolin, etc. is effective and practically applied. However, it is very difficult to improve lowering in rigidity of polyamide film by moisture absorption. For example, addition of talc or glass fibers will result in lowering in transparency and pinhole resistance, and also addition of a modified polyolefin and an ionomer resin which are low in moisture absorption, will still not only impair transparency, but also bring about lowering in the gas barrier property and rigidity.

SUMMARY OF THE INVENTION

Accordingly, a first object of the present invention is to solve the problems as mentioned above and provide a material for a molded article of which molded article has an excellent liquid or gas barrier property. Further, a second object is to provide a material for a polyamide film having an excellent gas barrier property, transparency and slippage characteristic, and also having the rigidity necessary for lamination, printing and bag-making.

The present inventors have found that, by formulation of a layered silicate into a polyamide resin, while retaining or improving excellent mechanical and heat properties possessed by the polyamide resin, further gas barrier properties (permeation preventive properties) to oxygen or gasoline more excellent as compared with other resins hitherto possessed can be more improved and, also the relatively inferior drawback of readiness in permeation of water or alcohols can be improved, to accomplish the present invention.

The material for a molded article and film having a liquid or gas barrier property of the present invention is a mixture containing a polyamide resin or a resin mixture containing a polyamide resin and a layered silicate uniformly dispersed therein.

DESCRIPTION OF THE PREFERRED EMBODIMENTS

In the following, the present invention is described in detail.

The polyamide resin or the resin mixture containing a polyamide resin which constitutes the material for a molded article and film of the present invention (hereinafter sometimes abbreviated as the component (A)) is first described.

The polyamide resin is one having an acid amide bond (—CONH—) in the molecule, as exemplified by polymers or copolymers obtained from ε-caprolactam, 6-aminocaproic acid, ω-enanthlactam, 7-aminoheptanoic acid, 11-aminoundecanoic acid, 9-aminononanoic acid, α-pyrrolidone, α-piperidone and the like; polymers or copolymers obtained by polycondensation of diamines such as hexamethylenediamine, nonamethylenediamine, undecamethylenediamine, dodecamethylenediamine, metaxylylenediamine and the like with dicarboxylic acids such as terephthalic acid, isophthalic acid, adipic acid, sebacic acid and the like, or blends of these.

The polyamide resin of the component (A) should be preferably one having an average molecular weight of 9,000 to 30,000.

As other resins to be used in the case when the component (A) is a mixture of a polyamide resin and other polymers, there may be included polypropylene, ABS resin, polyphenylene oxide, polycarbonate, polyethyleneterephthalate, polybutyleneterephthalate, etc.

When the component (A) is made of a mixture, it is preferred that the content of the polyamide resin should be 40 % by weight or more.

The component (B) is a layered silicate. The component (B) is a component which contributes to imparting an excellent liquid or gas barrier property to the material for molded article.

As the layered silicate, one shaped in a flat plate having one side of 0.002 to 1μm and a thickness of 6 to 20 Å is preferred.

The layered silicate when dispersed in the component (A) should be preferably such that individual layers maintain an interlayer distance of 20 Å or longer on an average and dispersed uniformly. Here, the interlayer distance refers to the distance between the gravitational centers of the flat plates of the layered silicate, and uniform dispersion refers to the state wherein 50 % by weight or more, preferably 70% by weight or more of the layered silicate is dispersed without formation of local lumps with each sheet of layered silicate or multilayers with an average lamination of not more than 5 layers being dispersed in parallel or randomly, or under the state wherein parallel and random states exist in a mixture.

As the starting material for such layered silicate, there may be included layered phyllosilicate minerals constituted of magnesium silicate or aluminum silicate. Specific examples may include smectite type clay minerals such as montmorillonite, saponite, biderite, nontronite, hectorite, stevensite, etc., vermicullite, halloysite, etc. These may be either natural or synthetic. Among them, montmorillonite is preferred.

The amounts of the component (B) formulated may be preferably 0.05 to 15 parts by weight, more preferably 0.1 to 10 parts by weight based on 100 parts by weight of the component (A). If the formulation ratio of the component (B) is less than 0.05 part by weight, the improvement effects of the liquid or gas barrier property, slippage characteristic and rigidity are small, while if it exceeds 15 parts by weight, the molded article becomes worsened in impact strength and tensile elongation at break, and also transparency of the film is lowered to impair undesirably the excellent characteristics inherently possessed by the polyamide resin.

When the material of the present invention is a material for a molded article, dyes, pigments, fibrous reinforcing materials, particulate reinforcing materials, plasticizers, heat-resistant agents, foaming agents and flame retardants, etc. can be formulated therein suitably in appropriate amounts depending on the purpose.

As the constituent of the polyamide film of the present invention, there can be otherwise formulated, if necessary, lubricants, antioxidants, heat resistance stabilizers, weathering resistance imparting agents, antistatic agents, transparency improvers, etc.

The process for preparing the material for a molded article and film of the present invention is not particularly limited, but, for example, the following processes may be applicable.

When the starting material of the layered silicate of the component (B) is a multi-layered clay mineral, there can be also employed the process in which it is contacted with a swelling agent to expand previously the interlayer distances, thereby making monomers readily incorporatable between the layers, and then the polyamide monomer is mixed and polymerized (see U.S. Pat. No. 4,739,007). Also, by use of a polymeric compound as the swelling agent, interlayer distances may be previously expanded to 20 Å or longer before the mineral is melted and kneaded with the polyamide resin or a resin composition containing the polyamide to be uniformly dispersed therein. Further, it is possible to apply the process in which the polyamide composition containing the layered silicate at high concentration is prepared, and the composition is mixed with the polyamide containing no layered silicate.

The reason why the molded article obtained from the material for a molded article of the present invention exhibits a liquid or gas barrier property is not clear, but it may be considered that microscopic dispersion of the layered silicate in the polyamide resin may have the action of interfering with the pathway of liquid or gas.

The material for molding of the present invention is applicable for various uses requiring liquid or gas barrier property. Examples of applicable uses may include a gasoline tank, alcohol tank, fuel tube, fuel strainer, brake oil tank, clutch oil tank, power steering oil tank, Freon tube for cooler, Freon tank, canister, air cleaner, intake system parts, etc.

The method for molding into a film is not particularly limited, but the polyamide film of the present invention can be formed into either a stretched film or an unstretched film.

As the method for molding an unstretched film, there can be applied various methods, such as the casting method (Tdie method) in which the polyamide formulated with the layered silicate is extruded through an extruder at an extrusion temperature of 200° to 300° C., extruded into a film through a T-die and the cast film is cooled on the casting roll surface, or the tubular method in which the product extruded in cylindrical shape through a ring-shaped die is cooled with air or water.

As the method for molding a stretched film, it is possible to apply the method in which the unstretched film molded by the casting method or the tubular method is monoaxially or biaxially stretched at a stretching temperature of 50° to 180° C., and, if necessary, thermally fixed at a temperature of 120° C. or higher and lower than the melting point. When carrying out biaxial stretching, the tenter method biaxial stretching method or the tubular method biaxial stretching method known in the art may be applicable.

The polyamide film of the present invention can be also formed into a laminate comprising the polyamide film containing the layered silicate uniformly dispersed therein as described above and a polymeric film other than that.

As other polymeric films, there may be included low density polyethylene film, high density polyethylene film, polypropylene film, ethylene-vinyl acetate copolymer film, ionomer resin film, etc.

The method for forming the polyamide film into a laminate is not particularly limited, but, for example, there can be applied the method in which the polyamide film and one or two or more polymeric films are bonded together with an adhesive; or alternatively the method in which the polyamide and the polymeric compound constituting one or two or more other polymeric films are melted and coextruded through a multi-layer orifice through an adhesive resin.

The polyamide film of the present invention can exhibit an excellent gas barrier property and rigidity even in a high humidity atmosphere, since the layered silicate exists within the film under the state of being uniformly dispersed therein.

Next, methods for producing polyamide composite material to be used in such uses as described above are to be described.

In the prior art, for the purpose of improving mechanical characteristics of organic polymeric materials, there have been investigated addition and mixing of inorganic materials such as glass fibers, calcium carbonate, silicate, mica, etc.

As one of them, inventors including one of the present inventors have found previously that by polymerizing a polyamide monomer in the presence of a clay mineral, the polyamide and the layered silicate constituting the clay mineral are conjugated on molecular level to give a composite material excellent in mechanical strength and heat resistance (see U.S. Pat. No. 4,739,007).

Further, inventors including one of the present inventors also investigated about the process for producing the above composite material excellent in mechanical strength and heat resistance and proposed a preparation process according to the steps of 3 stages (see U.S. Pat. No. 4,810,734). This production process has the contacting, step of contacting a silicate and an organic cation having a carboxyl group which is the swelling agent in a dispersing medium such as water, etc. to obtain a composite having the property of being swelled with the monomer at the melting temperature of the polyamide monomer or higher with the condition containing the dispersing medium; then the mixing step of mixing the composite with the polyamide monomer; and further the polymerization step of polymerizing the polyamide monomer in the mixture by heating the mixture.

However, in this production process, the swelling temperature is required to be set at higher than room temperature as 80° C. in the above contacting step, whereby an increase of production cost and a lowering in production capacity will be brought about, and therefore there remains room for further improvement.

As described above, in the production process of a polyamide composite material excellent in mechanical strength and heat resistance having the steps of contacting, mixing and polymerization, because the treatment in the contacting step is required to be conducted at high temperature, there are involved problems such as an increase of production cost or a lowering in production capacity, etc.

Next, a preferable embodiment of the process for preparing the material for a molded article and film having a liquid or gas barrier property of the present invention is to be described in detail.

According to the preferable embodiment, a polyamide composite material having further excellent mechanical strength and heat resistance as compared with the polyamide composite material of the prior art can be obtained economically and efficiently.

The preferable process for preparing the material of the present invention is characterized by having the steps of:

contacting a layered silicate with a cation exchange capacity of 50 to 200 milliequivalents/100 g with an organic cation of a lactam which is the swelling agent in a dispersing medium, thereby obtaining a composite having the organic cation of the above lactam adsorbed onto the above layered silicate, mixing the above composite with a polyamide monomer, and polymerizing the polyamide monomer in the mixture obtained in the above mixing step.

In the following, the preferable process for preparing the material of the present invention is described for each step.

First, the treatment of the contacting step is carried out. The contacting step is the step of contacting a layered silicate with the organic cation of a lactam which is the swelling agent under room temperature in a dispersing medium, thereby obtaining a composite having the swelling agent adsorbed onto the above silicate.

The layered silicate to be used in this step has a cation exchange capacity of 50 to 200 milliequivalents/100 g. If the cation exchange capacity is less than 50 milliequivalents/100 g, the exchange adsorption of the swelling agent cannot be sufficiently effected, whereby the desired composite material can be obtained with difficulty. If it exceeds 200 milliequivalents/100 g, the bonding force between layers becomes too firm and therefore the desired composite material of the present invention can be obtained only with difficulty.

The layered silicate should be preferably adjusted previously to the desired shape and size by carrying out a crushing treatment by means of mixer, ball mill, vibration mill, pin mill, jet mill, grinder, etc.

The organic cation of lactam which is the swelling agent has a role to expand the interlayer distances of the layered silicate and a role to give a force to incorporate the polymer to the layered silicate. The organic cation of lactam is a cation represented by the following formula:

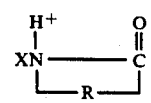

Here, X is generally H or CH$_3$, the group R is an alkylene group generally represented by the formula —(CH$_2$)$_n$—, but of course these are not limitative of the present invention. The organic cation of lactam can be used as a single kind, and also two or more kinds can be used in combination. Specific examples of the organic cation of lactam may include those derived from the lactams shown below.

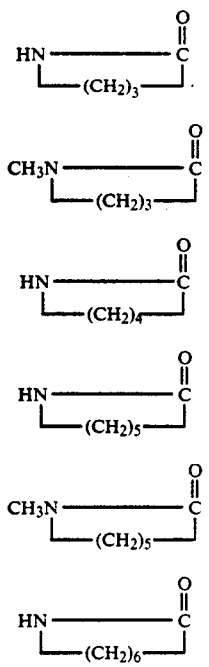

The amount of the organic cation of lactam as the swelling agent used may be preferably 5 to 100 parts by weight based on 100 parts by weight of the layered silicate. If it is less than 5 parts by weight, it becomes difficult to adsorb the polyamide monomer onto the layered silicate, while an amount in excess of 100 parts by weight is not desirable, because the swelling agent is incorporated as the nonuniform component into the composite material when the swelling agent and the polyamide monomer are different to lower the mechanical strength of the composite material. When the swelling agent is used as such also as the polyamide monomer, it is necessary to determine the amount by also taking the amount as the polyamide monomer into account.

The dispersing medium performs the action of making contact with the swelling agent easier by dispersing the layered silicate. The dispersing medium ca be determined suitably depending on the kind of the layered silicate, but one which can disperse uniformly the layered silicate and is well compatible with the swelling agent and the polyamide monomer.

Examples of the dispersing medium may include water, methanol, ethanol, propanol, isopropanol, ethylene glycol, 1,4-butane diol, glycerine, etc. The dispersing medium can be used as a single kind, and also two or more kinds can be used in combination.

The amount of the dispersing medium used may be preferably 5,000 parts by weight or lower based on 100 parts by weight of the composite obtained in the contacting step. If the amount of the dispersing medium employed exceeds the above 5,000 parts by weight, it will take an undesirably long time for flowout of the dispersing medium from the composite material in the polymerization step.

As the method for contacting the layered silicate with the organic cation of lactam, there can be applied the method in which the layered silicate is immersed in the dispersing medium containing the organic cation of lactam and then the layered silicate is washed to remove excessive organic cation of lactam, or the method in which the cation exchange resin previously exchanged with the organic cation of lactam is contacted with a suspension of the layered silicate in the dispersing medium to effect ion exchange.

The temperature during the contact is not particularly limited, but since the organic cation of lactam excellent in solubility in water is used as the swelling agent in the present invention, the desired composite can be obtained also when contact is effected under room temperature.

By the treatment of such contact step, a composite comprising the layered silicate and the organic cation of lactam containing the dispersing medium can be obtained. This composite has the property of being swelled with a polyamide monomer under a molten state and/or the property of being swelled with a mixture of the polyamide monomer and the dispersing medium. Swelling as mentioned in the present invention refers to penetration of the monomer under a molten state or the mixture of the monomer and the dispersing medium between the layers to expand the layers (namely the state of swelling). The driving force of such swelling phenomenon may be considered to be the affinity force between the cation and the monomer under a molten state or the monomer and the dispersing medium.

A part or all of the dispersing medium may be removed from the composite obtained in the contacting step, if necessary, prior to being subjected to the subsequent step.

Next, the treatment of the mixing step is carried out. This mixing step is the step of mixing the composite obtained in the foregoing contacting step with a polyamide monomer.

The mixing method is not particularly limited, which can mix uniformly the both components.

Examples of the polyamide monomer to be used in this step may include amino acids such as 6-amino-n-caproic acid, 12-aminolauric acid and the like, lactams such as α-pyrrolidone, ε-caprolactam, ω-laurinlactam and the like.

The amount of the polyamide monomer used should be preferably determined in connection with the contents of the polyamide and the layered silicate in the composite material finally obtained. More specifically, it is preferred that the polyamide should be formulated so that the layered silicate may be 0.05 to 150 parts by weight based on 100 parts by weight of the polyamide.

A content of the layered silicate being less than 0.05 part by weight in the composite material is not desirable, because no sufficient reinforcing and packing effect can be obtained. On the other hand, an amount in excess of 150 parts by weight is not desirable, because it makes the content of the polyamide relatively smaller, whereby only interlayer compound powder is obtained and this can be utilized as the molded product with difficulty.

As the next step, the treatment of the polymerization step is carried out. This polymerization step is the step of obtaining the composite material by polymerizing the polyamide monomer in the mixture obtained in the above mixing step.

The polymerization method and the polymerization conditions may differ depending on the kind of the monomer, but no special method and condition is required, but known polymerization method and conditions can be applied.

Also, in the polymerization step, various polymerization catalysts, polymerization accelerators, etc. can be added, if necessary.

The composite material thus obtained comprises a polyamide and a layered silicate uniformly dispersed in the polyamide, and the layered silicate has a thickness of layer of 7 to 12 Å, with an interlayer distance of silicate of 20 Å or longer, and comprises the polymer chains of the polyamide and the layered silicate ion bonded together. The interlayer distance refers to the distance between the gravitational centers of the flat plates of the layered silicate.

The composite material obtained according to the preparation process of the present invention can be utilized by molding according to direct injection molding, extrusion molding or heating pressurization molding, etc. Also, a molded product can be obtained by carrying out the polymerization reaction in the above polymerization step in a given mold.

Further, the following preparation process is more preferable, because the preparation step of the composite in the above preparation process and the treatment of the mixing step of polyamide monomer can be practiced in one step.

More specifically, a more preferable process for preparing the material of the present invention is characterized by having the steps of:

mixing a layered silicate having a cation exchange capacity of 50 to 200 milliequivalents/100 g, a compound which becomes a swelling agent through the action of an acid, a polyamide monomer and an acid with a pKa value of 0 to 3 in a dispersing medium, and polymerizing the polyamide monomer in the mixture obtained in the above step.

In the following, the more preferable process for preparing the material of the present invention is to be described.

First, the treatment of the mixing step is carried out. This mixing step is a step of contacting a layered silicate, a compound which becomes a swelling agent through the action of an acid (hereinafter merely called "swelling agent") and a polyamide monomer in a dispersing medium under room temperature in the presence of an acid with a pKa value of 0 to 3, thereby obtaining a composite having the polyamide monomer further adsorbed onto the composite having the swelling agent adsorbed onto the above layered silicate.

The swelling agent becomes cationic through the action of an acid with a pKa value of 0 to 3 which is permitted to exist during mixing, and has a role to expand the interlayer distances of the layered silicate and a role of giving the force of incorporating the polyamide monomer, finally the polyamide to the layered silicate. Also, when an amino acid or a lactam is used as the swelling agent, they can be used not only as the swelling agent, but as the polyamide monomer as such.

Examples of the swelling agent may include amines, amino acids or lactams. More specifically, there may be included aliphatic amines such as octadecylamine $CH_3(CH_2)_7NH_2$, dimethyloctadecylamine $CH_3(CH_2)_{17}N(CH_3)_2$, trimethyloctadecylamine $CH_3(CH_2)_{17}N(CH_3)_3$ and the like; aromatic amines such as p-phenylenediamine $H_2NC_6H_4NH_2$, α-naphthylamine $(C_{10}H_7NH_2)$, p-aminodimethylaniline $N(CH_3)_2C_6H_4NH_2$, benzidine $H_2NC_6H_4C_6H_4NH_2$ and the like; amino acids such as 4-amino-n-butyric acid $H_2N(CH_2)_3COOH$, 6-amino-n-caproic acid $H_2N(CH_2)_5COOH$, 8-aminocaprylic acid $H_2N(CH_2)_7COOH$, 10-aminodecanoic acid $H_2N(CH_2)_9COOH$, 12-aminododecanoic acid $H_2N(CH_2)_{11}COOH$, 14-aminotetradecanoic acid $H_2N(CH_2)_{13}COOH$, 16-aminohexadecanoic acid $H_2N(CH_2)_{15}COOH$, 18-aminooctadecanoic acid $H_2N(CH_2)_{17}COOH$ and the like; and ω-laurinlactam represented by the following formula:

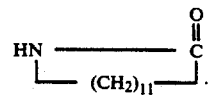

The amount of the swelling agent used may be preferably 5 to 100 parts by weight based on 100 parts by weight of the layered silicate. If it is less than 5 parts by weight, it becomes difficult to adsorb the polyamide monomer onto the layered silicate, while an amount in excess of 100 parts by weight is not desirable, because the swelling agent is incorporated as the nonuniform component into the composite material when the swelling agent and the polyamide monomer are different to lower the mechanical strength of the composite material. When the swelling agent is used as such also as the polyamide monomer, it is necessary to determine the amount by also taking the amount as the polyamide monomer into account.

Examples of the polyamide monomer to be used in this step may include amino acids such as 6-amino-n-caproic acid, 12-aminolauric acid and the like, lactams such as α-pyrrolidone, ε-caprolactam, ω-laurinlactam and the like.

The amount of the polyamide monomer used should be preferably determined in connection with the weight ratio of the polyamide in the composite material finally obtained to the layered silicate. More specifically, it is preferable to formulate the polyamide so that the layered silicate may be 0.05 to 150 parts by weight based on 100 parts by weight of the polyamide in the composite material. If the content of the layered silicate in the composite material is less than 0.05 part by weight, it is not desirable because no sufficient reinforcing and packing effect can be obtained. On the other hand, if it exceeds 150 parts by weight, it is also not desirable because the content of the polyamide becomes relatively smaller to give only the interlayer compound powder, whereby it becomes difficult to utilize it as the molded product.

The acid to be used for imparting swelling ability to the swelling agent has a pKa within the range from 0 to 3. If the pKa is less than 0, the acid will corrode the reaction vessel, while if it exceeds 3, the amount of protons released is little to make it difficult to make the above swelling agent cationic. Examples of such acids having pKa values of 0 to 3 may include phthalic acid, phosphoric acid, chloroacetic acid and trichloroacetic acid.

The amount of the acid with a pKa value of 0 to 3 added may be preferably 0.05 to 5 equivalents relative to the total ion exchange capacity of the layered silicate. An amount less than 0.05 equivalent is not desirable because the swelling agent does not exhibit a swelling ability due to a too small amount of protons released, while an amount over 5 equivalents makes the acidic component excessive to lower the molecular weight of the polyamide after polymerization.

As the dispersing medium, the same as in the above preferable embodiment can be used.

The amount of the dispersing medium used may be preferably one so that the dispersing medium may be 100 to 5,000 parts by weight based on 100 parts by weight of the composite obtained in this mixing step. If the amount of the dispersing medium used is less than 100 parts by weight, no uniform mixing of the composite and the polyamide monomer can be performed, whereby the polyamide monomer can be adsorbed onto the composite with difficulty. On the other hand, if it exceeds 5,000 parts by weight, it will undesirably take too long a time for flowout of the dispersing medium from the composite material in the polymerization step.

The treatment method in the mixing step is not particularly limited, but for example, there can be applied the method in which the layered silicate is immersed in the dispersing medium containing the swelling agent, the polyamide monomer and the acid with a pKa of 0 to 3, and then the layered silicate is washed to remove the swelling agent, or alternatively the method in which the cation exchange resin previously exchanged with cations of the swelling agent is contacted with a suspension of the layered silicate and the polyamide monomer dispersed in the dispersing medium to effect ion exchange.

The temperature during mixing is not particularly limited, and when the swelling agent is an organic cation of a lactam excellent in solubility in water, the desired composite can be also obtained even when mixing and contact may be effected under room temperature.

The subsequent polymerization step can be carried out in the same manner as in the preferable embodiment as described above.

The present invention is described in more detail by referring to the Examples.

EXAMPLE 1

One hundred grams of montmorillonite with a thickness of one unit of layered silicate of 9.5 Å on an average and an average length of one side of about 0.1 $\mu$m were dispersed in 10 liters of water, then 51.2 g of 12-aminododecanoic acid and 24 ml of conc. hydrochloric acid were added and the mixture was stirred for 5 minutes, followed by filtration. Further, the filtered product was thoroughly washed and vacuum dried. By this operation, a composite of 12-aminododecanoic acid ammonium ion and montmorillonite was prepared. The content of the layered silicate in the composite became 80% by weight. The distance between the silicate layers was found to be 18.0 Å as measured by X-ray diffraction.

Next, into a reaction vessel equipped with a stirrer, 10 kg of $\epsilon$-caprolactam, 1 kg of water and 100 g of the above composite were charged, and the mixture was stirred so that the reaction system became intergally uniform at 100° C. Further, the temperature was raised up to 260° C., and the mixture was stirred under pressurization of 15 kg/cm$^2$ for one hour. Then, the pressure was released, and while the water was evaporated from the reaction vessel, the reaction was carried out under normal pressure for 3 hours. After completion of the reaction, the reaction product taken out in strands from the bottom nozzle of the reaction vessel was water-cooled and subjected to cutting to obtain pellets comprising a polyamide resin (average molecular weight 15,000) and montmorillonite. The pellets were immersed in hot water to extract and remove unreacted monomer (about 10%), followed by drying in vacuum, to give a material for a molded article of the present invention. The interlayer distance of this material was measured by X-ray diffraction to be 100 Å or longer.

Barrier property confirmation test

According to the method shown below, barrier properties to water and gasoline were tested. The results are shown in Table 1.

Barrier property to Freon

First, the material for molded article was extrusion molded under the following conditions to prepare a tube with an outer diameter of ½ inch and a thickness of 1 mm.

Extrusion molding conditions:
Extruder: manufactured by Nippon Seikosho K.K.
Screw diameter: 30 mm
Cylinder setting temperature: $C_1$ 220° C.; $C_2$ 255° C.; $C_3$ 255° C.; die 250° C.

Cooling conditions: water cooling system, water temperature 15° C.

Next, the above tube was cut into a length of 300 mm, which was reinforced with a blade (because pressure was applied after injection of Freon). Into the tube was injected Freon R-22 (Difreon 22, manufactured by Daikin Kogyo K.K.) until filled therewith, followed by sealing. Injection was conducted at −40° C., then the temperature was returned to normal temperature, the water attached on the tube was wiped off and further once the tube was dried at 100° C. for 22 hours to remove the attached water, and the weight thereafter was defined as the initial value. Next, for the Freon injected tube, the drying operations for 24 hours as the total, at 23° C. for 2 hours and at 100° C. for 22 hours, were repeated 10 days or longer, and the amount of Freon permeated per unit area per day on an average was measured from change of weight.

Barrier property to water

Into the same tube as used in the above Freon barrier property was filled calcium chloride (water absorber) until full, followed by sealing. Next, the tube was left to stand in an atmosphere of a relative humidity of 90% at 40° C. for 10 days or longer, and the amount of water permeated per unit area per day on an average was measured from change of weight.

Barrier property to gasoline

By use of the above molding material, a high density polyethylene (Hizex 8200; manufactured by Mitsui Sekiyukagaku Kogyo K.K.) and an adhesive (Admer; manufactured by Mitsui Sekiyukagaku Kogyo K.K.), a bottle of about 500 ml volume of 60 mm (diameter) ×200 mm consisting of Hizex 8200 (outer layer)/Admer (intermediate layer)/molding material (inner layer)=0.6 mm thickness/0.2 mm thickness/0.1 mm thickness was prepared by a three-layer blow molding machine. Into the bottle was injected 250 ml of gasoline, and the bottle was sealed and left to stand in an atmosphere of 60° C. for 12 weeks. By the reduction in weight of the whole bottle, the amount of gasoline permeated per unit area per day on an average was measured. Since the amount of gasoline permeated through the bottle containing no inner layer as described above is 100-fold or more than in the case of containing the inner layer, the outer layer and the intermediate layer as described above need not be taken into consideration in the present measurement result.

Mechanical properties of injection molded article

The molding material was injection molded under the molding conditions shown below to prepare test strips for measurement of mechanical properties. For the test strips, the respective tests as shown below were conducted. The results are shown in Table 1.

Injection molding conditions

Injection molding machine: IS-80, manufactured by Toshiba Kikai K.K.
Cylinder setting temperature: $C_1$ 240° C.; $C_2$ 250° C.; $C_3$ 250° C.; $C_4$ (nozzle) 250° C.
Injection pressure: 600 kg/cm2.
Mold temperature: 88° C.
Injection time: 10 seconds
Cooling time: 20 seconds Method for measuring mechanical properties Tensile strength at yield: ASTM-D-638.
Elongation at break: ASTM-D-638.
Flexural strength: ASTM-D-790.
Flexural modulus: ASTM-D-790.
All the tests were conducted under absolutely dry state at 23° C.

EXAMPLE 2

A molding material was obtained in the same manner as in Example 1 except that the amount of the composite prepared in Example 1 used was made 200 g, and further the respective measurements were conducted. The results are shown in Table 1.

EXAMPLE 3

A molding material was obtained in the same manner as in Example 1 except that the amount of the composite prepared in Example 1 used was made 500 g, and further the respective measurements were conducted. The results are shown in Table 1.

COMPARATIVE EXAMPLE 1

A molding material was obtained in the same manner as in . Example 1 except that no montmorillonite was used, and further the respective measurements were conducted. The results are shown in Table 1. In the representations, smaller permeability indicates more excellent barrier property.

TABLE 1

| | Example 1 | Example 2 | Example 3 | Comparative example 1 |
|---|---|---|---|---|
| Polyamide 6 (parts by weight) | 100 | 100 | 100 | 100 |
| Montmorillonite (parts by weight) | 0.89 | 1.77 | 4.44 | — |
| Permeability (mg/cm$^2$ · Day) | | | | |
| Freon | 0.42 | 0.25 | 0.11 | 0.57 |
| Water | 42.0 | 31.8 | 15.2 | 60.9 |
| Gasoline | 0.09 | 0.06 | 0.03 | 0.12 |
| Tensile strength (kg/cm$^2$) | 850 | 890 | 980 | 750 |
| Elongation (%) | >100 | >100 | 15 | >100 |
| Flexural strength (kg/cm$^2$) | 1,280 | 1,340 | 1,520 | 1,100 |
| Flexural modulus | 32,200 | 35,400 | 45,700 | 25,000 |

TABLE 1-continued

| | Example 1 | Example 2 | Example 3 | Comparative example 1 |
|---|---|---|---|---|
| (kg/cm$^2$)) | | | | |

As is apparent from Examples 1 to 3 and Comparative example 1, the molding material of the present invention can give molded articles having excellent barrier properties to liquid and gas.

In the following Examples 4 to 9 and Comparative examples 2 to 4, the physical properties were measured according to the methods as described below.

Molecular weight of polyamide

Relative viscosity was measured by use of 98 % sulfuric acid according to JIS K6810-1970 to determine molecular weight ($\bar{M}n$).

Transparency

Haze value (haze ratio) of the film was measured by means of a direct reading type haze meter manufactured by Suga Testing Machine K.K. according to ASTM D-1003.

Oxygen gas permeability

Oxygen gas permeability was measured by means of MOCON OXTRAN 100 A manufactured by Modern Control Co. according to ASTM D-3985-81.
The measurement conditions are 23° C., 0% RH and 100% RH.

Water vapor permeability

Water vapor permeability was measured by the cup method according to JIS Z-208.
The measurement conditions are 40° C. and 90% RH.

Slippage characteristic

By means of a slip tester manufactured by Rigaku Kogyo K.K., according to ASTM D-1894-63, dynamic coefficient of friction ($U_D$) was measured under an atmosphere of 23° C. and 65% RH.

Tensile characteristics

By means of Tensilon UTM-3 manufactured by Toyo Baldwin Co., tensile characteristics were measured according to ASTM D-882. As the method for evaluation of rigidity of the film, tensile modulus was employed.

Gelboflex test (pinhole resistance)

Pinhole resistance of the film was evaluated according to MIL-B-131C by means of a gelboflex tester manufactured by Rigaku Kogyo K.K. After a flex of 1,000 cycles was applied at 40 cycles/min., a rigid filter paper was placed under a film of 220×170 mm and the pinhole number was measured by the ink permeation method.

Dart impact test (impact resistance)

By means of a dart impact tester manufactured by Toyo Seiki K.K , dart impact test was conducted according to ASTM D-1709. A dart of 38 mm in diameter weighing 250 g was used, and the destruction energy at the time of 50% destruction was measured.

Tensile test, gelboflex test and dart impact test were conducted under an atmosphere of 23° C. and 65% RH.

EXAMPLE 4

One hundred grams of montmorillonite with a thickness of one unit of layered silicate of 9.5 Å on an average and an average length of one side of about 0.1 μm were dispersed in 10 liters of water, then 51.2 g of 12-aminododecanoic acid and 24 ml of conc. hydrochloric acid were added and the mixture was stirred for 5 minutes, followed by filtration. Further, the filtered product was thoroughly washed and vacuum dried. By this operation, a composite of 12-aminododecanoic acid ammonium ion and montmorillonite was prepared. The content of the layered silicate in the composite became 80% by weight. The distance between the silicate layers was found to be 18.0 Å as measured by X-ray diffraction.

Next, into a reaction vessel equipped with a stirrer, 10 kg of ε-caprolactam, 1 kg of water and 150 g of the above composite were charged, and the mixture was stirred so that the reaction system became internally uniform at 100° C. Further, the temperature was raised up to 260° C., and the mixture was stirred under pressurization of 15 kg/cm$^2$ for one hour. Then, the pressure was released, and while the water was evaporated from the reaction vessel, the reaction was carried out at 260° C. under normal pressure for 2 hours, and further at 260° C. under reduced pressure at 400 mm Hg for one hour. After completion of the reaction, the reaction product taken out in strands from the bottom nozzle of the reaction vessel was water-cooled and subjected to cutting to obtain pellets comprising a polyamide and montmorillonite. The pellets were immersed in hot water to extract and remove unreacted monomer (about 10%), followed by drying in vacuum.

By use of the pellets, kneading was performed by means of an extruder of 40 mm in diameter under the condition of a cylinder temperature of 260° C. and the mixture was extruded through a T-die of 300 mm width into a film, which was solidified on cooling rolls of 80° C. to prepare a film with a thickness of 60μ. The interlayer distance of the layered silicate contained in the film was found to be 100 Å or longer. For this film, measurements of respective physical properties were conducted. The results are shown in Table 2.

EXAMPLE 5

A film was prepared in the same manner as in Example 4 except that the amount of the composite placed in the reaction vessel in Example 4 was changed to 250 g, and its physical properties were measured. The interlayer distance of the layered silicate contained in the film was 100 Å or longer. The results are shown in Table 2.

EXAMPLE 6

A film was prepared in the same manner as in Example 4 except that the amount of the composite placed in the reaction vessel in Example 4 was changed to 350 g, and its physical properties were measured. The interlayer distance of the layered silicate contained in the film was 100 Å or longer. The results are shown in Table 2.

COMPARATIVE EXAMPLE 2

A film was prepared in the same manner as in Example 4 except that polymerization reaction was carried out by charging only 10 kg of ε-caprolactam and 1 kg of water without charging the composite into the reactor, and its physical properties were measured. The results are shown in Table 2.

TABLE 2

| | Example 4 | Example 5 | Example 6 | Comparative example 2 |
|---|---|---|---|---|
| Polyamide | | | | |
| Kind | PA6 | PA6 | PA6 | PA6 |
| Molecular weight | 22,000 | 21,000 | 21,000 | 22,000 |
| Montmorillonite (% by weight) | 1.26 | 2.16 | 3.01 | — |
| Transparency (%) | 1.6 | 1.7 | 2.0 | 1.7 |
| Oxygen permeability (ml/m$^2$ · 24 hr) | | | | |
|   0% RH | 28 | 22 | 17 | 43 |
|   100% RH | 140 | 102 | 84 | 191 |
| Water vapor permeability (g/m$^2$/24 hr) | 195 | 151 | 107 | 273 |
| Slippage characteristic (μ$_D$) | 0.8–1.0 | 0.7–0.8 | 0.5–0.7 | 1.5–2.0 |
| Tensile strength at yield (kg/cm$^2$) | 340 | 370 | 410 | 250 |
| Tensile strength at break (kg/cm$^2$) | 1,080 | 1,060 | 1,050 | 1.170 |
| Elongation at break (%) | 570 | 550 | 480 | 620 |
| Tensile modulus (kg/cm$^2$) | 6,800 | 9,500 | 12,000 | 5,000 |
| Gelboflex (pinhole number) | 1 to 3 | 4 to 6 | 7 to 9 | 1 to 2 |

Film thicknesses are all 60μ, and tensile characteristics were measured for MD.

EXAMPLE 7

The film obtained in Example 4 was stretched biaxially simultaneously at a stretching temperature of 90° C. to each 2.0-fold laterally and longitudinally by means of a polymer film biaxial stretching device BIX-702 S Type for research manufactured by Iwamoto Seisaku-sho, and further thermally fixed at 140° C. to obtain a biaxially stretched film with a thickness of 15μ. The measurement results of the respective physical properties are shown in Table 3.

COMPARATIVE EXAMPLE 3

A film was obtained by stretching film obtained in Comparative example 2 in the same manner as in Example 7, and its physical properties were measured. The results are shown in Table 3.

TABLE 3

| | Example 7 | Comparative example 3 |
|---|---|---|
| Polyamide | | |
| Kind | PA6 | PA6 |
| Molecular weight | 22,000 | 22,000 |
| Montmorillonite (% by weight) | 1.26 | — |
| Transparency (%) | 2.7 | 1.0 |
| Oxygen permeability (ml/m$^2$ · 24 hr) | | |
|   0% RH | 55 | 80 |
|   100% RH | 172 | 250 |
| Tensile strength at break (kg/cm$^2$) | 2,100 | 1,800 |
| Elongation at break (%) | 160 | 160 |
| Tensile modulus (kg/cm$^2$) | 17,200 | 13,700 |

Film thicknesses are all 15μ, and tensile characteristics were measured for MD.

EXAMPLE 8

To the pellets of Example 1 (containing 1.26 % of layered silicate) were added 0.08 % by weight of ethylenebisstearylamide. By use of this mixture, a film of a three-layer structure of PA6 (outer layer)/adhesive resin (intermediate layer)/LDPE (inner layer) (20/20/30 μ) was obtained by means of a water-cooling three-layer inflation film molding device manufactured by Placo K.K. The adhesive resin is UBE-BOND F1100 (manufactured by Ube Kosan K.K.), and LDPE is UBE polyethylene F023 (manufactured by Ube Kosan K.K.). The molding conditions are as shown below.

Die diameter: diameter 100 mm.
Film flex diameter: 200 mm (B.U.R.=1.27)
Take-up speed: 10 m/min.
Cooling water temperature: 20° C.
Molding temperature (set):
PA6: 250° C., adhesive resin: 200° C., LDPE: 200° C.

The respective physical properties of the three-layer structure film are shown in Table 4.

EXAMPLE 9

By use of the pellets of Example 5 (containing 2.16 % of layered silicate) to which 0.08 % by weight of ethylenebisstearylamide was added, a film of the three-layer structure was prepared in the same manner as in Example 8. The respective physical properties of the three-layer structure film are shown in Table 4.

COMPARATIVE EXAMPLE 4

By use of the pellets containing no layered silicate obtained in Comparative example 2 to which 0.08 % by weight of ethylene-bissstearylamide was added, a film of the three-layer structure was prepared in the same manner as in Example 8. The respective physical properties of the three-layer structure film are shown in Table 4.

TABLE 4

| | Example 8 | Example 9 | Comparative example 4 |
|---|---|---|---|
| Polyamide | | | |
| Kind | PA6 | PA6 | PA6 |
| Molecular weight | 22,000 | 21,000 | 22,000 |
| Montmorillonite (% by weight) | 1.26 | 2.16 | — |
| Transparency (%) | 4.9 | 6.0 | 5.1 |
| Oxygen permeability ($ml/m^2 \cdot 24\ hr$) | | | |
| 0% RH | 47 | 37 | 54 |
| 100% RH | 151 | 129 | 204 |
| Water vapor permeability ($g/m^2/24\ hr$) | 11.9 | 10.8 | 14.5 |
| Slippage characteristic ($\mu_D$) | 0.8 to 1.0 | 0.7 to 0.9 | >2.0 |
| Tensile strength at yield ($kg/cm^2$) | 140 | 150 | 140 |
| Tensile strength at break ($kg/cm^2$) | 380 | 370 | 390 |
| Elongation at break (%) | 520 | 510 | 560 |
| Tensile modulus ($kg/cm^2$) | 2,700 | 3,200 | 2,000 |
| Gelboflex (pinhole number) | 1 to 3 | 4 to 6 | 1 to 2 |
| Dart impact strength (kg · cm) | 31 | 35 | 27 |

Tensile characteristics were measured for MD. (Unmeasurable, Dart impact strength, see Table 2 for other technical terms)

As is apparent from Examples 4 to 9 and Comparative examples 2 to 4, the polyamide film of the present invention is not only excellent in gas barrier property, transparency, slippage characteristic, impact resistance, but also has excellent rigidity, and therefore has good post-working characteristics such as printing, lamination, bag-making, etc., to be useful in practical applications particularly as the film for package of foods.

EXAMPLES 10 TO 12

One hundred grams of montmorillonite produced in Yamagata prefecture (cation exchange capacity 119 milliequivalents/100 g, occupied area per one negative charge: 106 $Å^2$) were dispersed in 3 liters of water, and 26.9 g of ε-caprolactam and 24.1 g of conc. hydrochloric acid (conc. 36 %) were added thereto, followed by stirring at room temperature for 60 minutes. After being further washed thoroughly, the mixture was suction filtered by use of a Büchner funnel to obtain a composite under hydrous state. A part of the composite was sampled and the water content (the value obtained by the following formula: water content/hydrous composite, hereinafter the same) was measured to be 96%. The interlayer distance of the composite of ε-caprolactam and montmorillonite was found to be 15 Å.

Next, by use of an autoclave equipped with a stirrer as the reaction vessel, the above hydrous composite was added to ε-caprolactam at ratios shown in Table 5 (the numerical value is represented in terms of parts by weight), followed by mixing under stirring. .(/;,.

Then, under stirring, water was distilled out by elevating the temperature to 260° C. in a nitrogen gas stream. Then, heating was continued for additional 3 to 12 hours to obtain a composite material.

The composite material obtained was crushed by a hammer mill, washed with hot water and then vacuum dried. The interlayer distance of the montmorillonite in the composite material after such treatment was measured by the powdery X-ray method. The results are shown in Table 5.

Also, the composite material obtained was molded into test strips, and by use of them, tensile test, heat distortion test and impact resistance test were conducted. The test methods were according to ASTM. The results are shown in Table 5.

COMPARATIVE EXAMPLES 5 TO 7

One hundred grams of montmorillonite produced in Yamagata prefecture (cation exchange capacity 119 milliequivalents/100 g, occupied area per one negative charge: 106 $Å^2$) were dispersed in 3 liters of water, and 51.2 g of 12-aminolauric acid and 24.1 g of conc. sulfuric acid (conc. 36 %) were added thereto, followed by stirring at room temperature for 60 minutes. However, in such reaction under room temperature, no similar composite to Examples 10 to 12 could be obtained. This was confirmed by carrying out dissolution and polymerization of ε-caprolactam similarly as in Examples 10 to 12 to obtain a composite material, and measuring the interlayer distance (9.5 Å) of the montmorillonite in the material and observing the state of the montmorillonite dispersed by means of a transmission type electron microscope (irregularly dispersed one layer by one layer without uniform dispersion, most forming large lumps of about 0.1 to 20 μ).

Accordingly, after stirring under room temperature for 60 minutes as described above, stirring was further effected at 80° C. for 60 minutes. Subsequently, after further washed with water thoroughly, the mixture was suction filtered with a Büchner funnel to obtain a composite under hydrous state. A part of the composite was sampled and the water content was measured to be 90%.

Next, by use of an autoclave equipped with a stirrer as the reaction vessel, the above hydrous composite was added to ε-caprolactam at ratios shown in Table 5, followed by mixing under stirring.

Then, under stirring in a nitrogen gas stream, water was distilled out by elevating the temperature to 260° C. Then, heating was further continued for 3 to 12 hours to give composite materials.

By use of the composite materials, interlayer distances were measured similarly as in Examples 10 to 12, and further tensile tests, etc. were conducted. The results are shown in Table 5.

a polyamide composite material of the present invention.

The composite material obtained was crushed by a hammer mill, washed with hot water and then vacuum dried. The interlayer distance of the montmorillonite in the composite material after such treatment was measured by the powdery X-ray method. Also, the composite material obtained was molded into test strips, and by use of them, tensile test, heat distortion test and impact resistance tests were conducted. The test methods were according to ASTM. The results are shown in Table 6.

COMPARATIVE EXAMPLES 8 TO 10

Composite materials were obtained in the same manner as in Example 13 except for using acetic acid (pKa=4.8) in place of phosphoric acid as the acid, and

TABLE 5

|  | Example 10 | Example 11 | Example 12 | Comparative example 5 | Comparative example 6 | Comparative example 7 |
|---|---|---|---|---|---|---|
| ε-Caprolactam | 100 | 100 | 100 | 100 | 100 | 100 |
| Hydrous composite |  |  |  |  |  |  |
| Composite | 2.0 | 5.7 | 8.1 | 2.0 | 5.7 | 8.1 |
| Water | 50 | 143 | 203 | 21 | 52 | 83 |
| Interlayer distance of montmorillonite (Å) | >100 | >100 | >100 | >100 | >100 | >100 |
| Tensile strength (MPa) | 78 | 97 | 62 | 76 | 97 | 51 |
| Elongation (%) | >100 | 6.1 | 4.2 | >100 | 7.3 | 2.5 |
| Modulus (GPa) | 1.5 | 2.0 | 2.2 | 1.4 | 1.9 | 2.1 |
| Scharpy impact strength (KJ/m$^2$) |  |  |  |  |  |  |
| Not notched | 120 | 63 | 25 | 102 | 53 | 17 |
| Notched | 4.2 | 4.5 | 3.8 | 3.6 | 6.1 | 3.5 |
| Heat distortion temperature (°C.) | 130 | 164 | 165 | 118 | 152 | 153 |

As described in Examples 10 to 12, in the production process of the present invention, an organic cation of lactam is used as the swelling agent, and therefore the treatment of the contacting step can be practiced under room temperature without heating. In contrast, heating up to 80° C. is required in Comparative examples 5 to 7.

Also, as is apparent from Table 5, the heat distortion temperature was not elevated to higher than 153° C. in Comparative examples 5 to 7, while it was improved by about 35° C. up to 165° C. by the comparison of Examples 10 to 12. Strength, elongation, modulus and impact strength were equal to or higher than those of Comparative examples.

As is apparent from Examples 10 to 12 and Comparative examples 5 to 7, according to a preferable production process of the present invention, the swelling temperature can be made lower, because an organic cation of lactam is used as the swelling agent in the contacting step. Also, according to the production process of the present invention, a polyamide composite material excellent in both mechanical strength and heat resistance can be obtained economically and efficiently.

EXAMPLES 13 TO 15

By use of an autoclave equipped with a stirrer as the reaction vessel, 100 g of montmorillonite produced in Yamagata prefecture (cation exchange capacity 119 milliequivalents/100 g, occupied area per one negative charge: 106 Å$^2$) was dispersed in 3 liters of water, and ε-caprolactam and phosphoric acid (pKa=2.1) were added thereto at the ratios shown in Table 6, followed by stirring at room temperature for 60 minutes. Then, under stirring, the temperature was elevated to 260° C. in a nitrogen gas stream and water was distilled off, followed by heating continued for 5 to 6 hours to give the tests were conducted similarly. The results are shown in Table 6.

COMPARATIVE EXAMPLES 11 TO 13

Composite materials were obtained in the same manner as in Example 13 except for using hydrochloric acid (pKa=−3) in place of phosphoric acid as the acid, and the tests were conducted similarly. The results are shown in Table 6.

COMPARATIVE EXAMPLES 14 TO 16

One hundred grams of montmorillonite produced in Yamagata prefecture (cation exchange capacity 119 milliequivalents/100 g, occupied area per one negative charge: 106 Å$^2$) were dispersed in 3 liters of water, and 51.2 g of 12-aminolauric acid and 24.1 g of conc. sulfuric acid (conc. 36%) were added thereto, followed by stirring at room temperature for 60 minutes. Subsequently, after further washed with water thoroughly, the mixture was suction filtered with a Buchner funnel to obtain a composite under hydrous state. A part of the composite was sampled and the water content was measured to be 90%.

Then, by use of an autoclave equipped with a stirrer as the reaction vessel, the above hydrous composite was added to ε-caprolactam at ratios shown in Table 6, followed by mixing under stirring. Then, under stirring in a nitrogen gas stream, water was distilled out by elevating the temperature to 260° C. Then, heating was further continued for 5 to 6 hours to give composite materials.

By use of the composite materials, the tests were conducted similarly as in Examples 13 to 15. The results are shown in Table 6.

TABLE 6

|  | Example 13 | Example 14 | Example 15 | Comparative example 8 | Comparative example 9 | Comparative example 10 |
|---|---|---|---|---|---|---|
| ε-Caprolactam | 100 | 100 | 100 | 100 | 100 | 100 |
| Montmorillonite | 1.6 | 4.6 | 6.5 | 1.6 | 4.6 | 6.5 |
| Acid | Phosphoric acid (pKa = 2.1) added in equivalent amount to ion exchange capacity | | | Acetic acid (pKa = 4.8) added in equivalent amount to ion exchange capacity | | |
| Hydrous composite | | | | | | |
| Composite | — | — | — | — | — | — |
| Water | — | — | — | — | — | — |
| Interlayer distance of montmorillonite (Å) | >100 | >100 | >100 | >100 | >100 | >100 |
| Production time (hr) | 6 | 7 | 9 | 6 | 7 | 9 |
| Tensile strength (MPa) | 76 | 97 | 60 | 52 | 69 | 40 |
| Elongation (%) | >100 | 5.7 | 4.0 | >100 | 4.8 | 3.1 |
| Modulus (GPa) | 1.6 | 2.1 | 2.3 | 1.2 | 1.6 | 1.7 |
| Scharpy impact strength (KJ/m$^2$) | | | | | | |
| Not notched | 115 | 51 | 20 | 86 | 28 | 16 |
| Notched | 4.0 | 4.1 | 3.5 | 3.5 | 4.4 | 3.2 |
| Heat distortion temperature (°C.) | 127 | 157 | 159 | 72 | 119 | 131 |

|  | Comparative example 11 | Comparative example 12 | Comparative example 13 | Comparative example 14 | Comparative example 15 | Comparative example 16 |
|---|---|---|---|---|---|---|
| ε-Caprolactam | 100 | 100 | 100 | 100 | 100 | 100 |
| Montmorillonite | 1.6 | 4.6 | 6.5 | 1.6 | 4.6 | 6.5 |
| Acid | Hydrochloric acid (pKa = −3) added in equivalent amount to ion exchange capacity | | | — | — | — |
| Hydrous composite | | | | | | |
| Composite | — | — | — | 2.0 | 5.7 | 8.1 |
| Water | — | — | — | 21 | 52 | 83 |
| Interlayer distance of montmorillonite (Å) | >100 | >100 | >100 | >100 | >100 | >100 |
| Productin time (hr) | 6 | 7 | 9 | 2 | 13 | 20 |
| Tensile strength (MPa) | 72 | 96 | 55 | 76 | 97 | 51 |
| Elongation (%) | >100 | 6.1 | 4.4 | >100 | 7.3 | 2.5 |
| Modulus (GPa) | 1.3 | 2.0 | 2.2 | 1.4 | 1.9 | 2.1 |
| Scharpy impact strength (KJ/m$^2$) | | | | | | |
| Not notched | 108 | 48 | 18 | 102 | 53 | 17 |
| Notched | 3.8 | 4.1 | 4.0 | 3.6 | 6.1 | 3.5 |
| Heat distortion temperature (°C.) | 110 | 142 | 143 | 118 | 152 | 153 |

As is apparent from Examples 13 to 15 and Comparative examples 8 to 16, according to a preferable production process of the present invention, by use of a specific acid in the mixing step, the production steps can be simplified (shortening of production time), to give a polyamide composite material further economically and efficiently.

Also, both of the mechanical strength and the heat resistance of the molded article of the composite material obtained are excellent.

We claim:

1. A process for preparing a polyamide composite material which comprises:
    (a) contacting a layered silicate having a cation exchange capacity of 50 to 200 milliequivalents/100 g with an organic cation of a lactam in a dispersing medium, the organic cation of a lactam being a cation represented by the following formula:

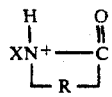

where X is H or CH$_3$ and R is an alkylene group represented by the formula —(CH$_2$)$_n$—, wherein n is 3 to 11, the dispersing medium being at least one dispersing medium selected from the group consisting of water, methanol, ethanol, propanol, isopropanol, ethylene glycol, 1,4-butane diol and glycerine, thereby adsorbing the organic cation of the lactam onto the layered silicate to form a composite,
    (b) mixing said composite with a polyamide monomer to form a mixture, and
    (c) polymerizing said polyamide monomer in said mixture.

2. The process for preparing a polyamide composite material according to claim 1, wherein the amount of the dispersing medium is 5,000 parts by weight or lower based on 100 parts by weight of the composite obtained in the contacting step.

3. The process for preparing a polyamide composite material according to claim 1, wherein the polyamide monomer is at least one selected from the group consisting of 6-amino-n-caproic acid, 12-aminolauric acid, α-pyrrolidone, ε-caprolactam and ω-laurinlactam.

4. The process for preparing a polyamide composite material according to claim 1, wherein the polyamide monomer is formulated so that the layered silicate is 0.05 to 150 parts by weight based on 100 parts by weight of the polyamide in said polymerized composite material.

5. The process for preparing a polyamide composite material according to claim 1, wherein
the amount of the dispersing medium being 5,000 parts by weight or lower based on 100 parts by weight of the composite obtained in the contacting step;
the polyamide monomer being at least one selected from the group consisting of 6-amino-n-caproic acid, 12-aminolauric acid, α-pyrrolidone, ε-caprolactam and ω-laurinlactam; and
the polyamide monomer being formulated so that the layered silicate is 0.05 to 150 parts by weight based on 100 parts by weight of the polyamide in said polyamide composite material.

6. A process for preparing a polyamide composite material which comprises:
mixing a layered silicate having a cation exchange capacity of 50 to 200 milliequivalents/100 g, a swelling agent which becomes cationic by contact with an acid, a polyamide monomer and an acid with a pKa value of 0 to 3 in a dispersing medium to form a mixture, the dispersing medium being at least one dispersing medium selected from the group consisting of water, methanol, ethanol, propanol, isopropanol, ethylene glycol, 1,4-butane diol and glycerine and polymerizing said polyamide monomer in said mixture.

7. The process for preparing a polyamide composite material according to claim 6, wherein the amount of the acid with a pKa value of 0 to 3 is 0.05 to 5 equivalents relative to the total ion exchange capacity of the layered silicate.

8. The process for preparing a polyamide composite material according to claim 6, wherein the acid with a pKa value of 0 to 3 is an acid selected from the group consisting of phthalic acid, phosphoric acid, chloroacetic, acid and trichloroacetic acid.

9. The process for preparing a polyamide composite material according to claim 6, wherein the swelling agent is selected from the group consisting of an amine, an amino acid and a lactam.

10. The process for preparing a polyamide composite material according to claim 6, wherein the swelling agent is selected from the group consisting of octadecylamine, dimethyloctadecylamine, trimethyloctadecylamine, p-phenylenediamine, α-naphthylamine, p-aminodimethylaniline, benzidine, 4-amino-n-butyric acid, 6-amino-n-caproic acid, 8-aminocaprylic acid, 10-aminodecanoic acid, 12-aminododecanoic acid, 14-aminotetradecanoic acid, 16-aminohexadecanoic acid, 18-aminooctadecanoic acid and a ω-laurinlactam having the following formula:

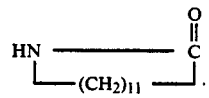

11. The process for preparing a polyamide composite material according to claim 10, wherein the swelling agent is in an amount of 5 to 100 parts by weight based on 100 parts by weight of the layered silicate.

12. The process for preparing a polyamide composite material according to claim 1, wherein n is 3 to 6.

13. The process for preparing a polyamide composite material according to claim 1, wherein the polymerizing is carried out at a temperature of 260° C. and at a pressure of 15 kg/cm² for 1 hour.

14. The process for preparing a polyamide composite material according to claim 6, wherein the polymerizing is carried out at a temperature of 260° C. for 3 to 12 hours.

15. The process for preparing a polyamide composite according to claim 3, wherein the layered silicate has one side of 0.002 to 1 μm and a thickness of 6 to 20 Å and the layered silicate comprises plates which are separated from each other by 20 Å or more on an average.

16. The process for preparing a polyamide composite according to claim 15, wherein the layered silicate is in an amount of 0. 1 to 10 parts by weight based on 100 parts by weight of the polyamide in the polyamide composite material.

17. The process for preparing a polyamide composite according to claim 16, wherein the layered silicate is a layered phyllosilicate mineral comprising at least one silicate selected from the group consisting of magnesium silicate and aluminum silicate.

18. The process for preparing a polyamide composite according to claim 16, wherein the layered silicate is at least one silicate selected from the group consisting of montmorillonite, saponite, biderite, nontronite, hectorite, stevensite, vermicullite and halloysite.

19. The process for preparing a polyamide composite according to claim 6, wherein the swelling agent is an organic cation of a lactam of the formula

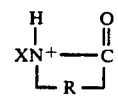

wherein X is H or CH₃ and R is —(CH₂)$_n$— wherein n is 3 to 11.

20. The process for preparing a polyamide composite material according to claim 1, wherein the organic cation of the lactam is in an amount of 5 to 100 parts by weight of the layered silicate.

21. The process for preparing a polyamide composite material according to claim 19, wherein the organic cation of the lactam is in an amount of 5 to 100 parts by weight of the layered silicate.

* * * * *